United States Patent
Taylor et al.

(10) Patent No.: US 12,104,355 B2
(45) Date of Patent: Oct. 1, 2024

(54) TRUCK LOAD DUMPING FOR AN AUTONOMOUS LOADER

(71) Applicant: Autonomous Solutions, Inc., Mendon, UT (US)

(72) Inventors: Eli Taylor, Mendon, UT (US); Daniel Morwood, Mendon, UT (US); Jaron Haight, Mendon, UT (US); Joshua Vanfleet, Mendon, UT (US); Robert Ashby, Mendon, UT (US); Taylor Bybee, Mendon, UT (US); Garrett Winward, Mendon, UT (US); Bret Turpin, Mendon, UT (US); Bryant Chandler, Mendon, UT (US)

(73) Assignee: Autonomous Solutions, Inc., Mendon, UT (US)

( * ) Notice: Subject to any disclaimer, the term of this patent is extended or adjusted under 35 U.S.C. 154(b) by 446 days.

(21) Appl. No.: 17/100,564

(22) Filed: Nov. 20, 2020

(65) Prior Publication Data
US 2021/0148083 A1 May 20, 2021

Related U.S. Application Data

(60) Provisional application No. 62/938,192, filed on Nov. 20, 2019, provisional application No. 62/938,199, (Continued)

(51) Int. Cl.
*E02F 9/20* (2006.01)
*B65G 67/04* (2006.01)
(Continued)

(52) U.S. Cl.
CPC .............. *E02F 9/205* (2013.01); *B65G 67/04* (2013.01); *E02F 9/2029* (2013.01); (Continued)

(58) Field of Classification Search
CPC ....... E02F 9/205; E02F 9/2029; E02F 9/2045; E02F 3/434; E02F 9/262; E02F 9/2037; (Continued)

(56) References Cited

U.S. PATENT DOCUMENTS 5,850,341 A    12/1998  Fournier et al.
9,487,931 B2 *  11/2016  Atkinson ................ G01S 17/00
(Continued)

OTHER PUBLICATIONS

Jo, K., et al., "Cloud Update of Tiled Evidential Occupancy Grid Maps for the Multi-Vehicle Mapping," Sensors (Basel), vol. 18, Issue. 12, 4119, pp. 1-17 (Dec. 2018).
(Continued)

*Primary Examiner* — Redhwan K Mawari

(57) ABSTRACT

Systems and methods are discussed to direct an autonomous loader to a dump truck. In some embodiments, a method may include receiving dump truck geolocation data for a dump truck; receiving loader geolocation data for an autonomous loader; raising a bucket on the autonomous loader to a height; directing the autonomous loader toward the dump truck using the loader geolocation data and the dump truck geolocation data so that the bucket is positioned above a body or bed of the dump truck; and rotating the bucket downward to release a load in the bucket into the body or bed of dump truck.

15 Claims, 17 Drawing Sheets

Related U.S. Application Data filed on Nov. 20, 2019, provisional application No. 62/938,204, filed on Nov. 20, 2019, provisional application No. 62/938,166, filed on Nov. 20, 2019.

(51) Int. Cl.
*E02F 9/26* (2006.01)
*G05D 1/00* (2006.01)

(52) U.S. Cl.
CPC .......... *E02F 9/2037* (2013.01); *E02F 9/2045* (2013.01); *E02F 9/26* (2013.01); *G05D 1/0212* (2013.01); *G05D 1/0278* (2013.01); *B65G 2203/0283* (2013.01); *B65G 2203/042* (2013.01); *B65G 2203/048* (2013.01)

(58) Field of Classification Search
CPC ...... B65G 2203/0283; B65G 2203/042; B65G 67/04; G05D 2201/0202
See application file for complete search history.

(56) References Cited

U.S. PATENT DOCUMENTS

| | | | | |
|---|---|---|---|---|
| 10,290,116 | B2* | 5/2019 | Laugier | G01C 21/3807 |
| 11,054,265 | B2* | 7/2021 | Geissler | G01C 21/3841 |
| 2009/0125198 | A1* | 5/2009 | Yang | E02F 9/2235 |
| | | | | 701/50 |
| 2013/0026263 | A1* | 1/2013 | Bamber | E02F 9/265 |
| | | | | 209/552 |
| 2014/0019042 | A1* | 1/2014 | Sugawara | G01S 19/45 |
| | | | | 701/431 |
| 2015/0308070 | A1* | 10/2015 | Deines | E02F 3/434 |
| | | | | 701/50 |
| 2015/0362922 | A1* | 12/2015 | Dollinger | G05D 1/0291 |
| | | | | 701/2 |
| 2016/0224026 | A1 | 8/2016 | Hamada et al. | |
| 2017/0124862 | A1* | 5/2017 | Sakai | G01S 13/86 |
| 2017/0158175 | A1* | 6/2017 | Fairfield | B60W 60/00276 |
| 2019/0226854 | A1* | 7/2019 | Geissler | G06V 20/584 |
| 2020/0148215 | A1* | 5/2020 | Mohajerin | G05D 1/0274 |
| 2021/0148086 | A1* | 5/2021 | Ready-Campbell | |
| | | | | G05D 1/0246 |

OTHER PUBLICATIONS

Saleh, S.M., et al., "Estimating the 2D Static Map Based on Moving Stereo Camera," 24th International Conference on Automation and Computing (ICAC), pp. 1-5 (Sep. 6-7, 2018).

Yapo, T.C., et al., "A Probabilistic Representation of LiDAR Range Data for Efficient 3D Object Detection," IEEE Computer Society Conference on Computer Vision and Pattern Recognition Workshops, pp. 1-8 (Jun. 2008).

Non-Final Office Action in U.S. Appl. No. 16/992,913 dated Apr. 21, 2022, 15 pages.

International Search Report and written opinion received for PCT Patent Application No. PCT/US2020/061622, dated Feb. 26, 2021, 12 pages.

\* cited by examiner

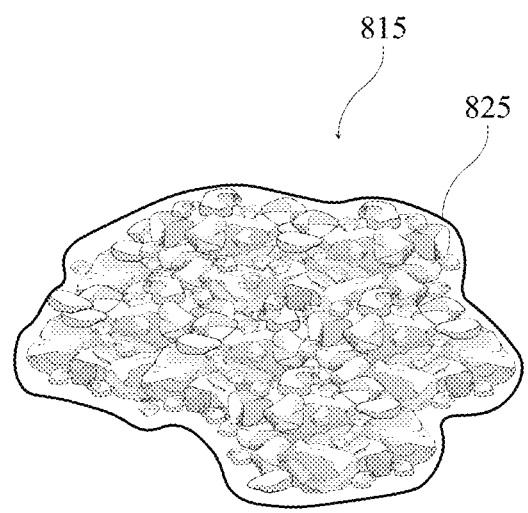
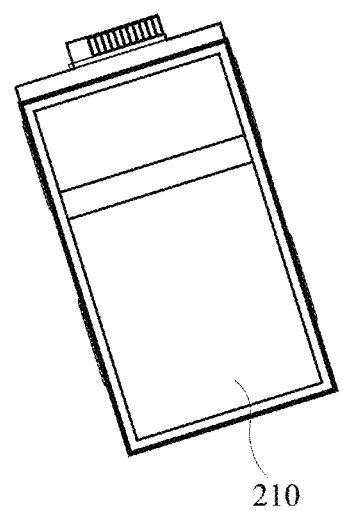
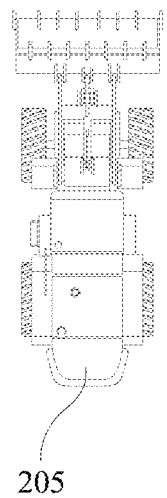
FIG. 8

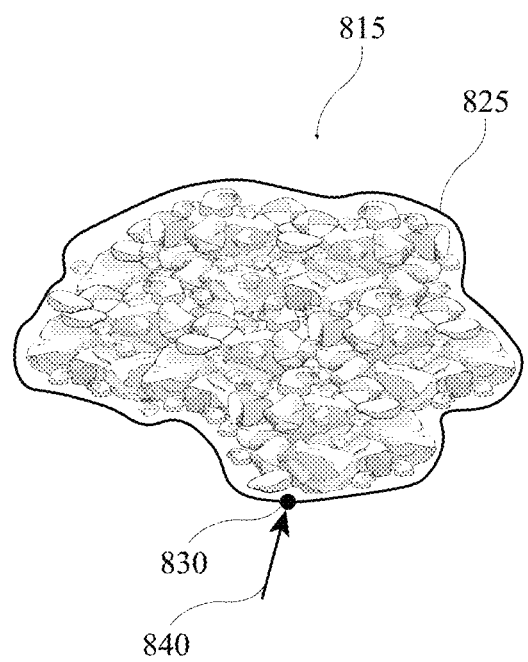
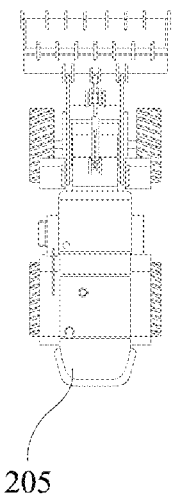
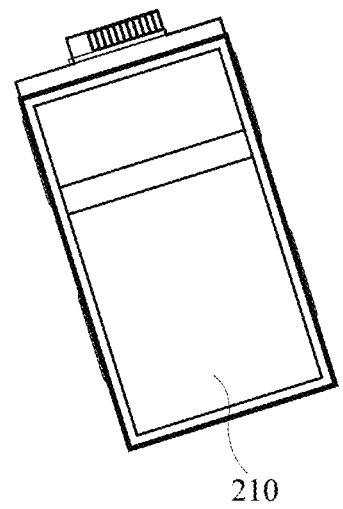
FIG. 9

TRUCK LOAD DUMPING FOR AN AUTONOMOUS LOADER

BACKGROUND

In normal operation, an autonomous vehicle may autonomously control its operation, for example, based on high level instructions. For instance, an autonomous vehicle may be capable of operating with limited or even no human direction beyond the high level instructions. As such, an autonomous vehicle may be utilized in a wide array of operations, particularly when operation is relatively predictable. For example, in a work area, an autonomous loader may interact and work with other vehicles such as dump trucks as well as with items in the work area such as gravel and soil. Precise actions and interactions of autonomous loaders with other vehicles is still problematic.

SUMMARY

Systems and methods are discussed to direct an autonomous loader to a dump truck. In some embodiments, a method may include receiving dump truck geolocation data for a dump truck; receiving loader geolocation data for an autonomous loader; raising a bucket on the autonomous loader to a predetermined (or sensed) height; directing the autonomous loader toward the dump truck using the loader geolocation data and the dump truck geolocation data so that the bucket is positioned above a body or bed of the dump truck; and rotating the bucket downward to release a load in the bucket into the body or bed of the dump truck.

In some embodiments, the autonomous loader may include a bucket control system that receives signals from the controller to raise the bucket and rotate the bucket.

In some embodiments, the controller guides the loader toward the dump truck using a path received from a base station via the transceiver.

In some embodiments, the autonomous loader may include a sensor array, and wherein the controller receives sensor data from the sensor array indicating the presence of the dump truck. In some embodiments, the sensory array comprises at least one sensor selected from the list consisting of lidar, radar, camera, and sonar. In some embodiments, the controller includes code that ignores warnings indicating that the loader is approaching the dump truck based on the sensor data.

In some embodiments, the dump truck geolocation data comprises GPS data and the loader geolocation data comprises GPS data. In some embodiments, the loader geolocation data includes corrections for the position of the bucket relative to the geolocation sensor. In some embodiments, the dump truck geolocation data is received from a base station via the transceiver.

In some embodiments, the dump truck geolocation data indicates the location of the body or bed of the dump truck. In some embodiments, the height is based on the height of the walls of the body or bed of the dump truck.

Some embodiments may include a method including receiving dump truck geolocation data for a dump truck; receiving loader geolocation data for an autonomous loader; raising a bucket on the autonomous loader to a height; directing the autonomous loader toward the dump truck using the loader geolocation data and the dump truck geolocation data so that the bucket is positioned above a body or bed of the dump truck; and rotating the bucket downward to release a load in the bucket into the body or bed of the dump truck.

In some embodiments, the method may include guiding the loader toward the dump truck using a path provided by a base station.

In some embodiments, the method may include receiving sensor data indicating the presence of the dump truck. In some embodiments, the method may include ignoring warnings indicating that the loader is approaching the dump truck based on the sensor data.

In some embodiments, the dump truck geolocation data comprises GPS data and the loader geolocation data comprises GPS data. In some embodiments, the loader geolocation data includes corrections for the position of the bucket relative to the geolocation sensor. In some embodiments, the dump truck geolocation data indicates the location of the body or bed of the dump truck.

In some embodiments, the predetermined height is based on the height of the walls of the body or bed of the dump truck.

Some embodiments include an autonomous method comprising receiving a location of a load location at a load zone; determining a load path to the load location based on the load location and the loader geolocation data; instructing a speed control system and a steering system of the autonomous loader to follow the load path to the load location; instructing the speed control system and a shovel mechanism to collect a load at the load zone; receiving at the autonomous loader a dump truck position and a dump heading (or a hopper location or a hopper approach angle); determining a backup path and a dump truck approach path based on the dump truck position, the dump heading, and the geolocation data; instructing the speed control system and the steering system to follow the backup path and the dump truck approach path to the dump truck; and instructing the shovel mechanism to dump the load in the dump truck.

In some embodiments, the method may include determining a reverse turn path that has an angle that is the intersecting angle of the dump truck approach path and the backup path.

In some embodiments, the load path has an angle that is the normal angle to a load zone boundary. In some embodiments the load zone boundary is determined by driving the autonomous loader around the load zone and collecting geolocation data. In some embodiments the dump truck approach path is perpendicular relative to the dump truck heading. In some embodiments the dump truck approach path terminates at a position on the dump truck that is offset in one or two dimensions from the dump truck position.

Some embodiments may include an autonomous loader comprising a speed control mechanism; a steering system; a shovel mechanism; a geolocation sensor (e.g., GPS sensor) that can produce loader geolocation data; a transceiver that may communicate with and receive data from at least a base station; and a controller communicatively coupled with the speed control mechanism, the steering system, the geolocation sensor, the shovel mechanism, and the transceiver. In some embodiments, the controller has code that receives a location of a load location at a load zone; determines a load path to the load location based on the load location and the loader geolocation data; instructing a speed control system and a steering system of the autonomous loader to follow the load path to the load location; instruct the speed control system and a shovel mechanism to collect a load at the load zone; receives at the autonomous loader a dump truck position and a dump heading; determine a backup path and a dump truck approach path based on the dump truck position, the dump heading, and the geolocation data; instruct the speed control system and the steering system to follow the backup path and the dump truck approach path to the dump truck; and instruct the shovel mechanism to dump the load in the dump truck.

In some embodiments, the controller may determine a reverse turn path that has an angle that is the intersecting angle of the dump truck approach path and the backup path.

In some embodiments, the load path has an angle that is the normal angle to a load zone boundary. In some embodiments the load zone boundary is determined by driving the autonomous loader around the load zone and collecting geolocation data. In some embodiments the dump truck approach path is perpendicular relative to the dump truck heading. In some embodiments the dump truck approach path terminates at a position on the dump truck that is offset in one or two dimensions from the dump truck position.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

FIG. 8 is an illustration of a work zone with an autonomous loader working within a work zone according to some embodiments.

FIG. 9 is an illustration of a work zone with a defined load boundary, a defined load location, and an approach angle according to some embodiments.

DETAILED DESCRIPTION

Systems and methods are disclosed for an autonomous loader to approach a dump truck in order to dump a load in the bucket of the autonomous loader. Most autonomous control system include an obstacle detection and/obstacle avoidance subsystem. These systems may change the path or behavior of the autonomous loader when an obstacle is detected along a path. Such systems may be problematic when the autonomous loader needs to approach a dump truck to dump a load. Indeed, when the autonomous loader is at the dump truck, the autonomous loader is so close to the dump that an obstacle avoidance system or a safety system would not allow the autonomous loader to approach the dump truck. Embodiments disclosed in this document allow an autonomous loader to approach a dump truck while using obstacle detection and/obstacle avoidance systems.

Systems and methods are also disclosed for an autonomous loader to approach a load zone, backup, and approach a dump truck in a work zone. In some embodiments, the autonomous loader may need to determine a load approach vector based on a load position and a load zone perimeter. In some embodiments, the autonomous loader may determine a dump truck load vector based on the position and heading of the dump truck (or hopper). Based on these vectors, for example, the autonomous loader may create paths that can be used to direct the autonomous loader to the load zone and the dump truck. The autonomous loader may then follow these paths.

Figure 1:
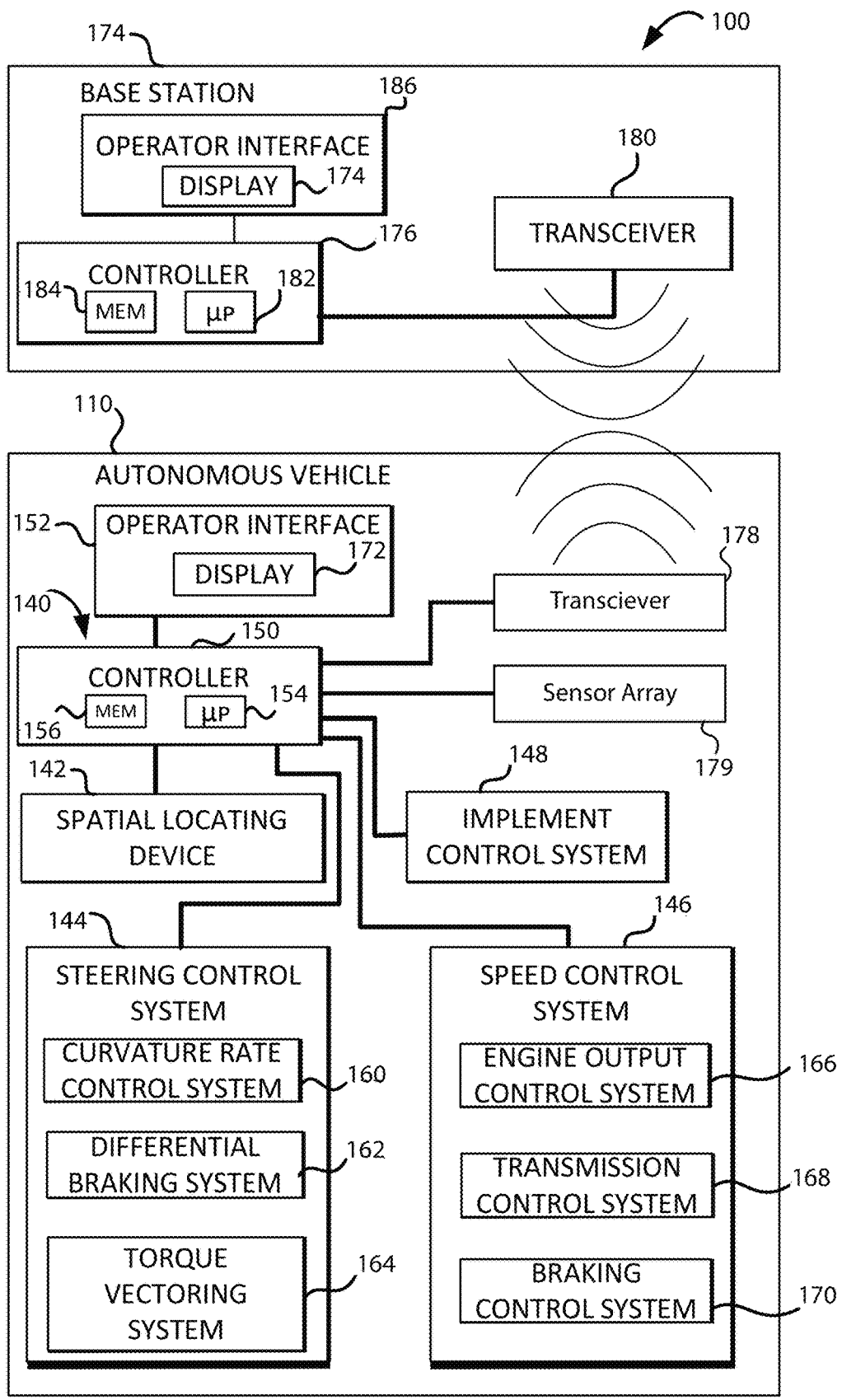
FIG. 1 illustrates a block diagram of an example autonomous loader communication system of the present disclosure.

FIG. 1 is a block diagram of a communication and control system 100 that may be utilized in conjunction with the systems and methods of the present disclosure, in at least some embodiments. The communication and control system 100 may include a vehicle control system 140 which may be mounted on an autonomous loader 110. The autonomous loader 110, for example, may include a loader, wheel loader, track loader, dump truck, digger, backhoe, forklift, etc. In some embodiments, the communication and control system 100 may include any or all components of computational unit 1700 shown in FIG. 17.

The autonomous loader 110, for example, may also include a spatial locating device 142, which may be mounted to the autonomous loader 110 and configured to determine a position of the autonomous loader 110 as well as a heading and a speed of the autonomous loader 110. The spatial locating device 142, for example, may include any suitable system configured to determine the position and/or other characteristics of the autonomous loader 110, such as a global positioning system (GPS), a global navigation satellite system (GNSS), or the like. In certain embodiments, the spatial locating device 142 may determine the position and/or other characteristics of the autonomous loader 110 relative to a fixed point within a field (e.g., via a fixed radio transceiver). In some embodiments, the spatial locating device 142 may determine the position of the autonomous loader 110 relative to a fixed global coordinate system using GPS, GNSS, a fixed local coordinate system, or any combination thereof. In some embodiments, the spatial locating device 142 may include any or all components of computational unit 1700 shown in FIG. 17.

In some embodiments, the autonomous loader 110 may include a steering control system 144 that may control a direction of movement of the autonomous loader 110. In some embodiments, the steering control system 144 may include any or all components of computational unit 1700 shown in FIG. 17.

In some embodiments, the autonomous loader 110 may include a speed control system 146 that controls a speed of the autonomous loader 110. In some embodiments, the autonomous loader 110 may include an implement control system 148 that may control operation of an implement towed by the autonomous loader 110 or integrated within the autonomous loader 110. In some embodiments, the implement control system 148 may, for example, include any type of implement such as, for example, a buck, a bucket, a blade, a dump bed, a plow, an auger, a trencher, a scraper, a broom, a hammer, a grapple, forks, boom, spears, a cutter, a tiller, a rake, etc. In some embodiments, the speed control system 146 may include any or all components of computational unit 1700 shown in FIG. 17.

In some embodiments, the control system 140 may include a controller 150 communicatively coupled to the spatial locating device 142, the steering control system 144, to the speed control system 146, and the implement control system 148. In some embodiments, the control system 140 may be integrated into a single control system. In other embodiments, the control system 140 may include a plurality of distinct control systems. In some embodiments, the control system 140 may include any or all the components show in FIG. 17.

In some embodiments, the controller 150 may receive signals relative to many parameters of interest including, but not limited to: vehicle position, vehicle speed, vehicle heading, desired path location, off-path normal error, desired off-path normal error, vehicle state vector information, curvature state vector information, turning radius limits, steering angle, steering angle limits, steering rate limits, curvature, curvature rate, rate of curvature limits, roll, pitch, rotational rates, acceleration, and the like, or any combination thereof.

In some embodiments, the controller 150 may be an electronic controller with electrical circuitry configured to process data from the spatial locating device 142, among other components of the autonomous loader 110. The controller 150 may include a processor, such as the processor 154, and a memory device 156. The controller 150 may also include one or more storage devices and/or other suitable components (not shown). The processor 154 may be used to execute software, such as software for calculating drivable path plans. Moreover, the processor 154 may include multiple microprocessors, one or more "general-purpose" microprocessors, one or more special-purpose microprocessors, and/or one or more application specific integrated circuits (ASICS), or any combination thereof. For example, the processor 154 may include one or more reduced instruction set (RISC or CISC) processors. In some embodiments, the controller 150 may include any or all the components show in FIG. 17.

In some embodiments, the memory device 156 may include a volatile memory, such as random access memory (RAM), and/or a nonvolatile memory, such as ROM. The memory device 156 may store a variety of information and may be used for various purposes. For example, the memory device 156 may store processor-executable instructions (e.g., firmware or software) for the processor 154 to execute, such as instructions for calculating drivable path plan, and/or controlling the autonomous loader 110. The memory device 156 may include flash memory, one or more hard drives, or any other suitable optical, magnetic, or solid-state storage medium, or a combination thereof. The memory device 156 may store data such as field maps, maps of desired paths, vehicle characteristics, software or firmware instructions and/or any other suitable data.

In some embodiments, the steering control system 144 may include a curvature rate control system 160, a differential braking system 162, and a torque vectoring system 164 that may be used to steer the autonomous loader 110. In at least one embodiment, the curvature rate control system 160 may control a direction of an autonomous loader 110 by controlling a steering system of the autonomous loader 110 with a curvature rate, such as an Ackerman style autonomous loader 110. In other embodiments, the curvature rate control system 160 may automatically rotate one or more wheels or tracks of the autonomous loader 110 via hydraulic actuators to steer the autonomous loader 110. By way of example, the curvature rate control system 160 may rotate front wheels/tracks, rear wheels/tracks, and/or intermediate wheels/tracks of the autonomous loader 110, either individually or in groups. The differential braking system 162 may independently vary the braking force on each lateral side of the autonomous loader 110 to direct the autonomous loader 110. Similarly, the torque vectoring system 164 may differentially apply torque from the engine to the wheels and/or tracks on each lateral side of the autonomous loader 110. While the illustrated steering control system 144 includes the curvature rate control system 160, the differential braking system 162, and the torque vectoring system 164, it should be appreciated that alternative embodiments may include one or more of these systems, in any suitable combination. Further embodiments may include a steering control system 144 having other and/or additional systems to facilitate turning the autonomous loader 110 such as an articulated steering system, a differential drive system, and the like.

In some embodiments, the speed control system 146 may include an engine output control system 166, a transmission control system 168, and a braking control system 170. The engine output control system 166 may vary the output of the engine to control the speed of the autonomous loader 110. For example, the engine output control system 166 may vary a throttle setting of the engine, a fuel/air mixture of the engine, a timing of the engine, and/or other suitable engine parameters to control engine output. In addition, the transmission control system 168 may adjust gear selection within a transmission to control the speed of the autonomous loader 110. Furthermore, the braking control system 170 may adjust braking force to control the speed of the autonomous loader 110. While the illustrated speed control system 146 includes the engine output control system 166, the transmission control system 168, and the braking control system 170, it should be appreciated that alternative embodiments may include one or two of these systems, in any suitable combination. Further embodiments may include a speed control system 146 having other and/or additional systems to facilitate adjusting the speed of the autonomous loader 110.

In some embodiments, the implement control system 148 may control various parameters of the implement towed by and/or integrated within the autonomous loader 110. For example, the implement control system 148 may instruct an implement controller via a communication link, such as a CAN bus or ISOBUS or any other communication networks such as, for example, ethernet, Wi-Fi, Bluetooth, Broad R, LTE, 5G, etc.

The implement control system 148, for example, may instruct an implement controller to adjust a penetration depth of at least one ground engaging tool of an agricultural implement, which may reduce the draft load on the autonomous loader 110.

The implement control system 148, as another example, may instruct the implement controller to transition an agricultural implement between a working position and a transport portion, to adjust a flow rate of product from the agricultural implement, to adjust a position of a header of the agricultural implement (e.g., a harvester, etc.), among other operations, etc.

The implement control system 148, as another example, may instruct the implement controller to adjust a shovel height, a shovel angle, a shove position, etc.

In some embodiments, the vehicle control system 100 may include a sensor array 179. In some embodiments, the sensor array 179 may facilitate determination of condition(s) of the autonomous loader 110 and/or the work area. For example, the sensor array 179 may include multiple sensors (e.g., infrared sensors, ultrasonic sensors, magnetic sensors, radar sensors, Lidar sensors, terahertz sensors, sonar sensors, cameras, etc.) that monitor a rotation rate of a respective wheel or track and/or a ground speed of the autonomous loader 110. The sensors may also monitor operating levels (e.g., temperature, fuel level, etc.) of the autonomous loader 110. Furthermore, the sensors may monitor conditions in and around the work area, such as temperature, weather, wind speed, humidity, and other conditions. In some embodiments, the sensors may detect physical objects in the work area, such as the parking stall, the material stall, accessories, other vehicles, other obstacles, or other object(s) that may in the area surrounding the autonomous loader 110. Further, the sensor array 179 may be utilized by the first obstacle avoidance system, the second obstacle avoidance system, or both.

The operator interface 152 may be communicatively coupled to the controller 150 and configured to present data from the autonomous loader 110 via a display 172. Display data may include: data associated with operation of the autonomous loader 110, data associated with operation of an implement, a position of the autonomous loader 110, a speed of the autonomous loader 110, a desired path, a drivable path plan, a target position, a current position, etc. The operator interface 152 may enable an operator to control certain functions of the autonomous loader 110 such as starting and stopping the autonomous loader 110, inputting a desired path, etc. In some embodiments, the operator interface 152 may enable the operator to input parameters that cause the controller 150 to adjust the drivable path plan. For example, the operator may provide an input requesting that the desired path be acquired as quickly as possible, that an off-path normal error be minimized, that a speed of the autonomous loader 110 remain within certain limits, that a lateral acceleration experienced by the autonomous loader 110 remain within certain limits, etc. In addition, the operator interface 152 (e.g., via the display 172, or via an audio system (not shown), etc.) may alert an operator if the desired path cannot be achieved, for example.

In certain embodiments, the control system 140 may include a base station 174 having a base station controller 176 located remotely from the autonomous loader 110. For example, in certain embodiments, control functions of the control system 140 may be distributed between the controller 150 of the autonomous loader control system 140 and the base station controller 176. In certain embodiments, the base station controller 176 may perform a substantial portion of the control functions of the control system 140. For example, in certain embodiments, a first transceiver 178 positioned on the autonomous loader 110 may output signals indicative of vehicle characteristics (e.g., position, speed, heading, curvature rate, curvature rate limits, maximum turning rate, minimum turning radius, steering angle, roll, pitch, rotational rates, acceleration, etc.) to a second transceiver 180 at the base station 174. In these embodiments, the base station controller 176 may calculate drivable path plans and/or output control signals to control the curvature rate control system 144, the speed control system 146, and/or the implement control system 148 to direct the autonomous loader 110 toward the desired path, for example. The base station controller 176 may include a processor 182 and memory device 184 having similar features and/or capabilities as the processor 154 and the memory device 156 discussed previously. Likewise, the base station 174 may include an operator interface 186 having a display 174, which may have similar features and/or capabilities as the operator interface 152 and the display 172 discussed previously.

Figure 2:
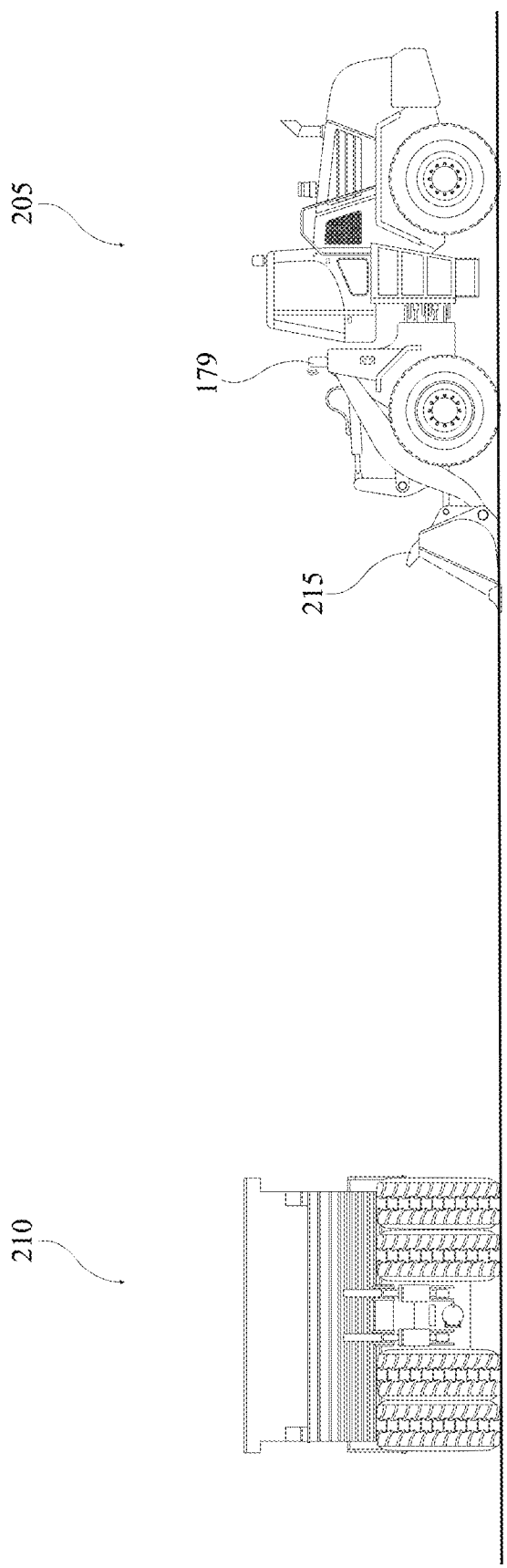
FIG. 2 is an illustration of an autonomous loader at a distance relative to a dump truck.

FIG. 2 is an illustration of an autonomous loader 205 at a distance relative to a dump truck 210. In this image, the autonomous loader 205 (e.g., autonomous loader 110) currently has the bucket 215 in the down position. In some embodiments, the dump truck 210 may represent a trailer, a flatbed truck, a hopper, etc. In some embodiments, the dump truck 210 may include a location where loads are routinely placed by an autonomous loader.

The autonomous loader 205 may include any type of loader such as, for example, a wheel loader, track loader, backhoe, forklift, etc. The autonomous loader 205 may include a bucket (or lift, or forks, or another implement) 215 that can be used to scoop and load material. The autonomous loader 205, for example, may also include one or more sensor arrays 179 mounted or attached with the autonomous loader 205. The sensors of the sensor array 179 may be mounted or attached with or to any part of the autonomous loader 205.

The dump truck 210 may include any type of dump truck. The dump truck 210 may or may not be autonomous. The dump truck 210 may include a large body or bed on the rear of the dump truck where loads may be dumped from the autonomous loader 205.

Figure 3:
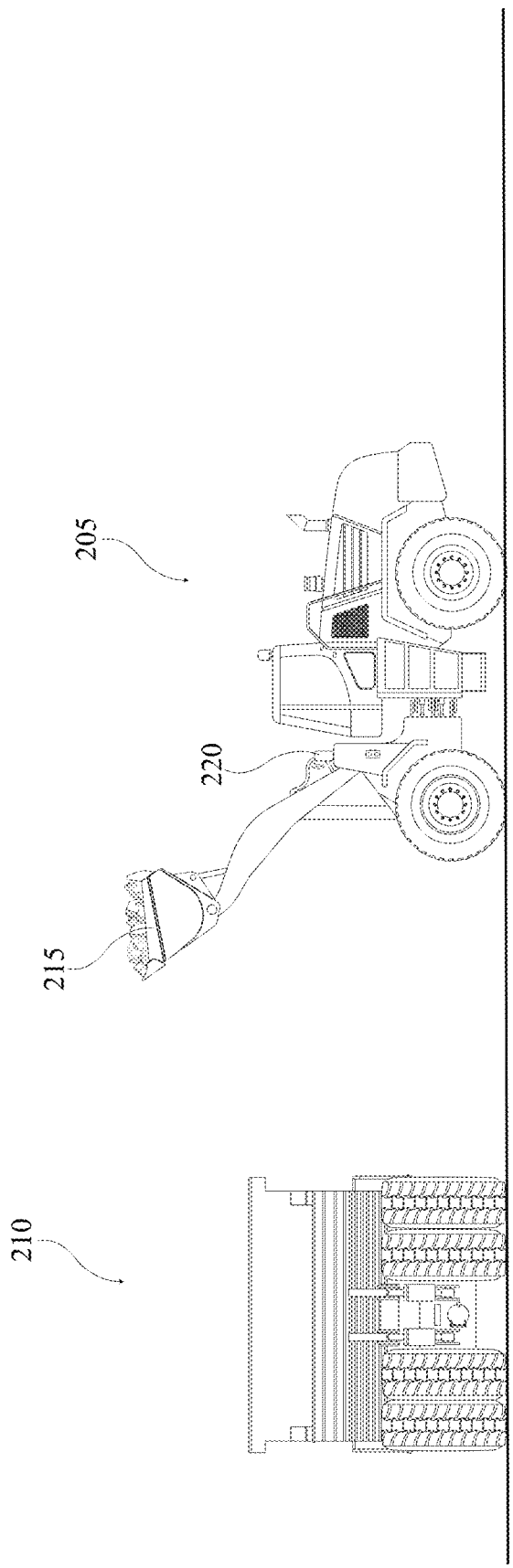
FIG. 3 is an illustration of the autonomous loader approaching the dump truck.

FIG. 3 is an illustration of the autonomous loader 205 approaching the dump truck 210. In this image, the autonomous loader 205 has moved the bucket 215 to upward position and includes a load in the bucket 215. In some embodiments, the height of the side walls of the body or bed on the dump truck 210 may be held in memory device 156 or may be received from the base station 174. The bucket 215 may be moved to height such that the bottom of the bucket 215 is above the height of the side walls or the height of the side walls plus an offset such as, for example, the offset may be 5, 10, 20, 30, 50, cm etc.).

Figure 4:
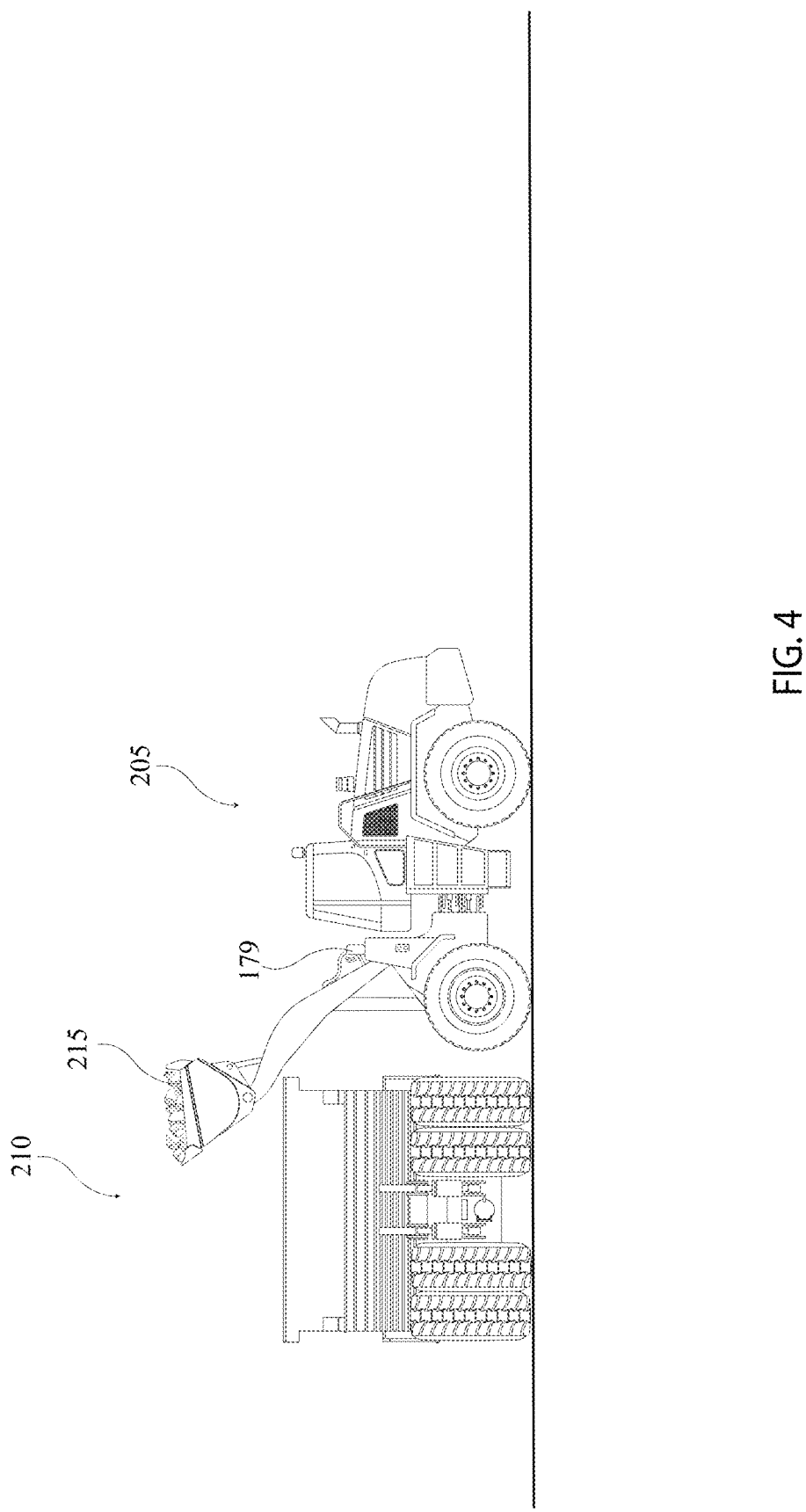
FIG. 4 is an illustration of the autonomous loader at the dump truck.
Figure 5:
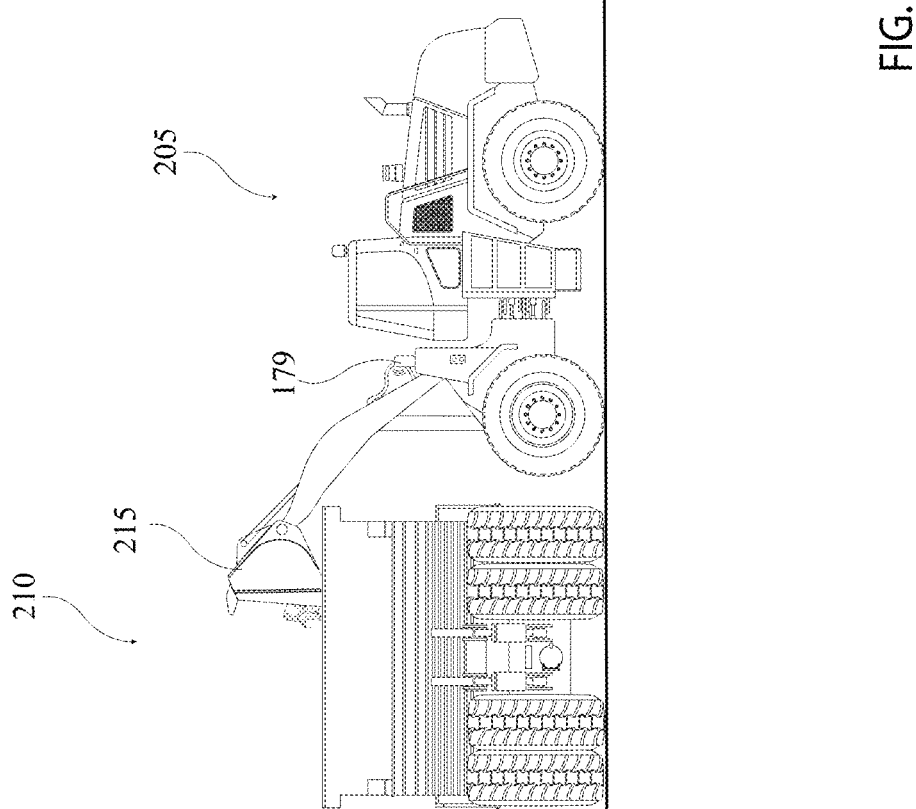
FIG. 5 is an illustration of the autonomous loader dumping a load into the dump truck.

At some point, when the dump truck 210 is within range one or more sensors of the sensor array 179 will detect the location of the dump truck 210. When the autonomous loader 205 is within a predetermined proximity of the dump truck 210, based on the proximity detection, the controller 150 should stop the autonomous loader 205 in order to avoid a collision. In some embodiments, in order to allow the autonomous loader 205 to dump the load in the bucket 215 into the body or bed of the dump truck 210, the autonomous loader 205 will need to get closer to the dump truck 210 than the predetermined proximity as shown in FIG. 4. This can be accomplished in a number of ways.

For example, a map may be created of the work area. The map may include the location of various obstacles, paths, humans, vehicles, etc. The map, for example, may indicate areas within the work area where the autonomous loader 205 is and is not allowed to navigate. The map, for example, may indicate that although the sensor array 179 detects the presence or location of the dump truck 210, the presence or location of the dump truck 210 may be ignored by the controller 150 as it navigates the path of the autonomous loader 205. For example, a boundary may be created around the geolocation of the dump truck 210 within the map. The boundary may indicate that the location of the dump truck should be ignored as an obstacle within the map.

As another example, any sensor data from the sensor array 179 that indicates the presence or location of the dump truck 210 may be ignored by the controller 150 as it navigates the path of the autonomous loader 205. For example, the dump truck 210 may communicate its geolocation to the autonomous loader 205 and/or communicate a geo boundary of the exterior of the dump truck 210 (e.g., the metes and bounds of the dump truck body in longitude and latitude).

In some embodiments, the controller 150 may receive dump truck geolocation data that indicates the location of the dump truck 210 such as, for example, from the base station 174. The dump truck geolocation data, for example, may include the size and the shape data of the dump truck 210. The dump truck geolocation data, for example, may include GPS data, corrected GPS data, longitude data, latitude data, site location data, etc. The dump truck geolocation data, for example, may include the geolocation of the point (e.g., the dump truck body or bed) where a load should be dumped by the autonomous loader 205.

In some embodiments, the controller 150 may receive loader geolocation data. The loader geolocation data, for example, may be received from the spatial locating device 142. The loader geolocation data, for example, may include GPS data, corrected GPS data, longitude data, latitude data, site location data, etc. The controller 150 may, for example, create corrected loader geolocation data indicates the geo-location of the bucket 215 based on the position of the bucket from the spatial locating device 142 when the bucket 215 is in the raised (or lowered) position.

In some embodiments, the controller 150 may drive the autonomous loader 205 to a position where the bucket 215 overlaps with the position of the dump truck body or bed using the dump truck geolocation data and the autonomous loader geolocation data (or the loader corrected geolocation data). This may be done while ignoring possible warnings about the presence or location of the dump truck 210 base on measurements from the sensor array 179 or based on the map of the working area showing a restricted vehicle or based on geolocation data. These warnings, for example, may be ignored only for the dump truck 210. These warnings, for example, may be ignored only when the autonomous loader 205 receives a signal from the dump truck 210 (e.g., via the base station 174) that the dump truck 210 is stopped or in position.

In some embodiments, data from sensors in the sensor array 179 may be used to indicate the relative position of the autonomous loader 205 relative to the dump truck 210. This data may be used by the controller to guide the autonomous loader 205 to a position next to the dump truck 210 such that the bucket of the autonomous loader 205 is positioned over the body or bed of the dump truck 210. In some embodiments, sensors can be disposed on the bucket, boom, bucket arms, etc.

Figure 6:
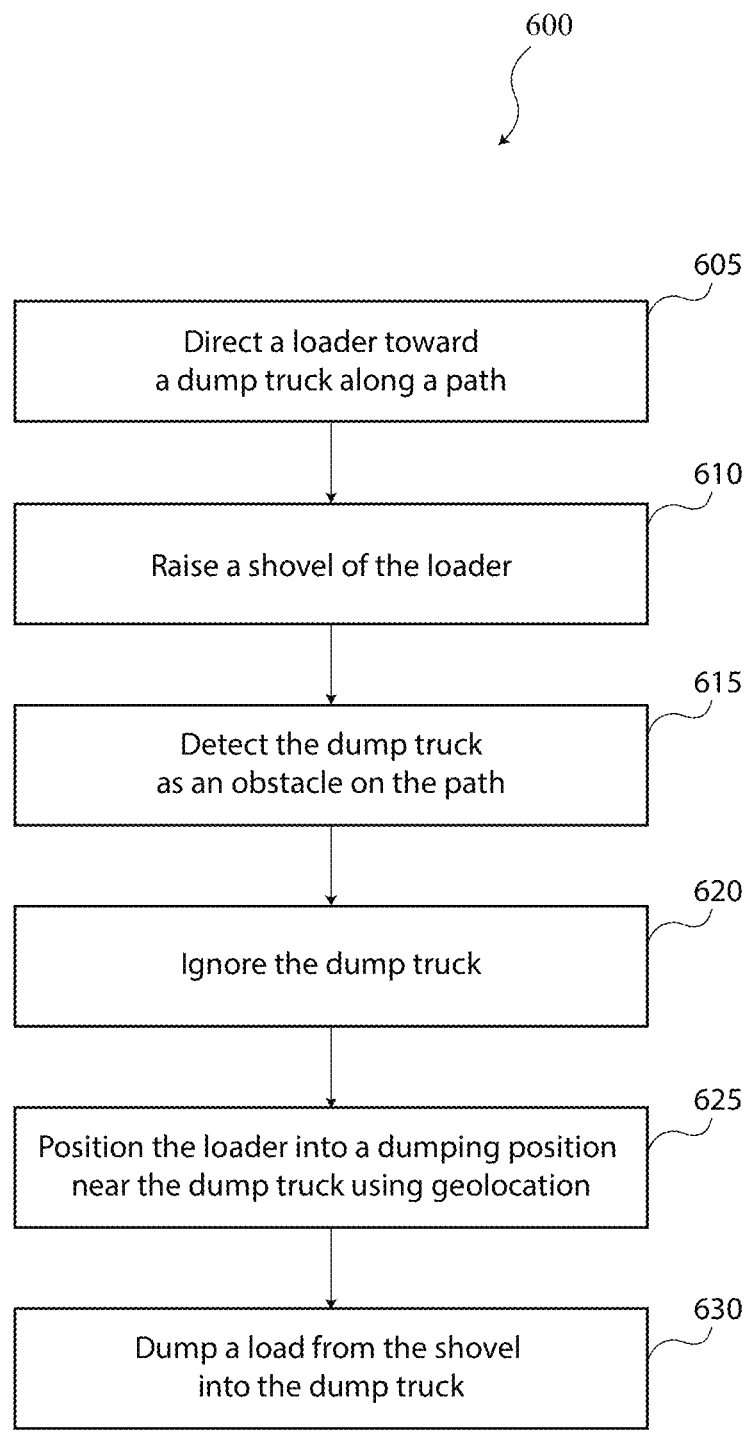
FIG. 6 is a flowchart of an example process for positioning an autonomous loader near a dump truck according to some embodiments.

FIG. 6 is a flowchart of an example process 600 for positioning an autonomous loader near a dump truck according to some embodiments. The process 600 may include one or more additional blocks. The blocks shown in the process 600 may occur in any order and over any period of time. Any of the blocks shown in the process 600 may be removed, replaced, or may occur in any order.

Process 600 begins at block 605 where an autonomous loader is directed toward a dump truck. This can be shown, for example, in FIG. 2. In some embodiments, the autonomous loader may be directed toward the dump truck along a path provided by a base station. The path may be created, for example, based on the locations of the autonomous loader and the dump truck. The path may be dynamically adjusted based on a number of factors such as, for example, obstacles detected along the path, the location of other vehicles, movement of the dump truck, movement of the loader, etc.

At block 610 the bucket (or boom) on the loader may be raised at some predetermined distance between the dump truck and the autonomous loader. The predetermined distance may include, for example, 5, 10, 15, 20, 25 meters. In some embodiments, the bucket may be raised while the autonomous loader is moving toward the dump truck.

In some embodiments, the bucket may be raised to a height that is greater than the height of the body or bed of the dump truck from the ground such as, for example, 5, 10, 20, 50, 100, etc. cm greater than the height of the body or bed of the dump truck. The height may be received from the base station or stored in memory (e.g., memory device 156). In some embodiments, the height may be received from the dump truck.

At block 615 the dump truck may be detected as an obstacle along the path. In some embodiments, the dump truck may be detected using an obstacle detection subsystem. In some embodiments, the controller 150 may include various subsystems (e.g., in software) that perform various functions. An obstacle detection subsystem, for example, may be used to detect the presence of obstacles using sensors mounted on the autonomous loader, map data, geolocation data, etc.

The dump truck, for example, may be detected by one or more sensors (e.g., in the sensory array 179). Sensor data from the one or more sensors may be provided to a controller (e.g., a sensor controller or the controller 150). The controller may, for example, interpret the sensor data in conjunction with a map, a trajectory or path of the autonomous loader, or geolocation data that may indicate that the dump truck is located in a position along the path.

As another example, the dump truck location and/or position may be detected based on geolocation data. For instance, the path of loader within a map of the work are may indicate that the path of the loader is moving along a path that intersects with the geolocation data of the dump truck (e.g., with a geolocation safety buffer). This detection may indicate that the loader is likely to impact into the dump truck if it continues along the current path.

In some embodiments, in response to detection, the controller may begin obstacle avoidance procedures such as, for example, changing paths, applying the brakes, sounding alarms, communicating emergency protocols, etc.

In some embodiments, in response to detection, the autonomous loader may ignore the dump truck as an obstacle at block 620 and/or ignore any obstacle avoidance procedures. For example, the dump truck location (e.g., including the boundaries of the dump truck) may be highlighted or indicated in the work map that any detected object in the space may be ignored. When the controller receives an indication that the path of the autonomous loader is approaching the dump truck having an indication to be ignored, the autonomous loader may continue along the path toward the dump truck.

In some embodiments, the autonomous loader may have a customized response to detection to complete a work project. For example, although the dump truck may be detected, the autonomous loader may approach the dump truck to deposit its load. The autonomous loader, however, may not approach (or ignore) other detected objects or obstacles. The response may be customized based on work requirements, work zone requirements, etc.

At block 625, despite the detection of the dump truck as an obstacle, the loader may be positioned into a dumping position relative to the dump truck such as, for example, as shown in FIG. 4. For example, geolocation data may be used to position the autonomous loader near the dump truck in a dumping position. As another example, sensor data (e.g., from sensor array 179) may be used to position the autonomous loader near the dump truck in a dumping position. The sensor data may include data about the location of the dump truck and the height of the body or bed of the dump truck.

In some embodiments, dumping position, for example, may be a position where the loader bucket is about 10, 25, 50, 100 cm, etc. above the top of the dump truck. Dumping position, for example, may be a position where the front of the loader is 0.25, 0.5, 0.75, 1.0, 1.25, 1.5, 1.75, 2.0 m etc. from the side of the dump truck. Dumping position, for example, may be a position where the autonomous loader is perpendicular (within 5-10% tolerance) with the dump truck. As another example, the dumping position may include an angle of approach that may also be perpendicular (within 5-10% tolerance) with the dump truck. In some embodiments, the speed of the autonomous loader may be slowed as the autonomous loader approaches the dumping position such as, for example, to prevent jarring or damage.

In some embodiments, sensor data from a sensor array may be used to position the loader at or near the dumping location. For example, one or more visual ranging sensors may be attached with the loader. The visual-ranging sensor may provide data indicating the distance (or range) between the loader and the dump truck. This data may be used to guide the loader toward the dump truck. In some embodiments, the loader may approach the dump truck at a slow speed such as, for example, less than about 10.0, 5.0, 2.5, 1.0 mph, etc. until the loader is at the dumping position (e.g., positioned a short distance from the dump truck).

At block 630 the load in the bucket of the loader may be dumped into the dump truck. Afterwards, the loader may back away from the dump truck. The bucket may be lowered, and the loader may return to another position along a path to collect another load.

Figure 7:
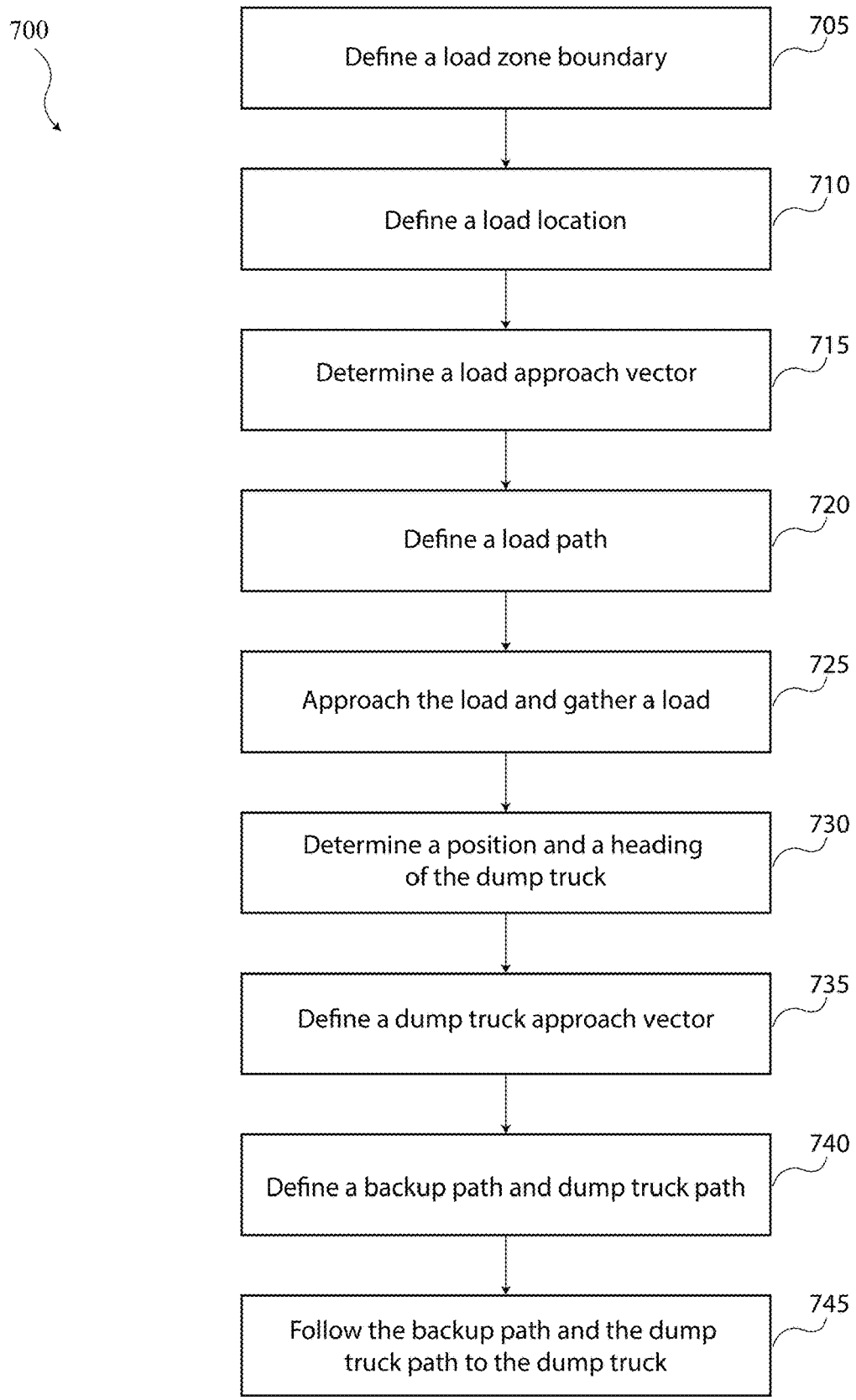
FIG. 7 is a flowchart of a process for an autonomous loader to approach a load zone and a dump truck according to some embodiments.

FIG. 7 is a flowchart of a process 700 for an autonomous loader 205 (e.g., autonomous loader 110) to approach a load zone 815 and a dump truck 210 according to some embodiments. FIGS. 8-16 are provided to illustrate the various blocks of process 700. The process 700 may include one or more additional blocks. The blocks shown in the process 700 may occur in any order and over any period of time. Any of the blocks shown in the process 700 may be removed, replaced, or may occur in any order.

The process 700, for example, may occur within a work zone as shown in FIG. 8. The work zone may include a load zone 815. The load zone 815, for example, may include any type of potential load that that will be loaded by the autonomous loader 205. The load zone 815, for example, may include material in a pile, mound, ground, subsurface, hillside, etc. as well as material dumped from a conveyor, loader, dump truck, belly dump, etc. As another example, the material may include rock, sand, rubble, ore, tailings, chemicals, fertilizers, waste, organic materials, foodstuffs, manufacturing wastes, slag byproducts, food products, rock, salt corn, etc. The work zone may include a dump truck 210 that may be repeatedly loaded by the autonomous loader 205. The work zone may include any number of other objects including building, construction zones, trucks, drills, tractors, scrapers, graders, roads, paths, etc.

At block 705, a load zone boundary 825 may be defined around the load zone 815 as shown in FIG. 8. The load zone boundary 825 may be defined within a map of the work zone using geolocation. The load zone boundary 825, for example, may be defined by a plurality of geolocation points that create a line that encircles or outlines the load zone 815. The load zone boundary 825, for example, may be defined by a vehicle such as, for example, the autonomous loader 205 or the dump truck 210, that includes geolocation tracking system (e.g., spatial locating device 142 or GPS devices) and can record a plurality of geolocation points around the load zone 815 to create the load zone boundary 825. A driver using mapping software, for example, may indicate within the mapping software that the load zone boundary 825 is being mapped while driving the vehicle around the load zone 815. As another example, the load zone boundary 825 may be defined in mapping software using an aerial photograph of the work zone by drawing a line around the work zone.

At block 710 a load zone location 830 can be defined at the load zone boundary 825 or within the load zone 815 as shown in FIG. 9. The load zone location 830, for example, defines the point at the load zone 815 where the autonomous loader 205 should approach the load zone 815 to pick up a load. The load zone location 830, for example, may be defined or indicated by a user within the mapping software.

At block 715 a load approach vector 840 can be defined as shown in FIG. 9. The load approach vector 840, for example, may indicate the approach the autonomous loader 205 should take to obtain a load. The load approach vector 840, for example, may be defined or indicated by a user within the mapping software. The load approach vector 840, for example, may be automatically determined from the load zone location 830 and the load zone boundary 825 such as, for example, the load approach vector 840 may be determined as the normal vector of the load zone boundary 825 at the load zone location 830 (e.g., 90 degrees to the tangent of the load zone boundary 825 at the load zone location 830).

Figure 10:
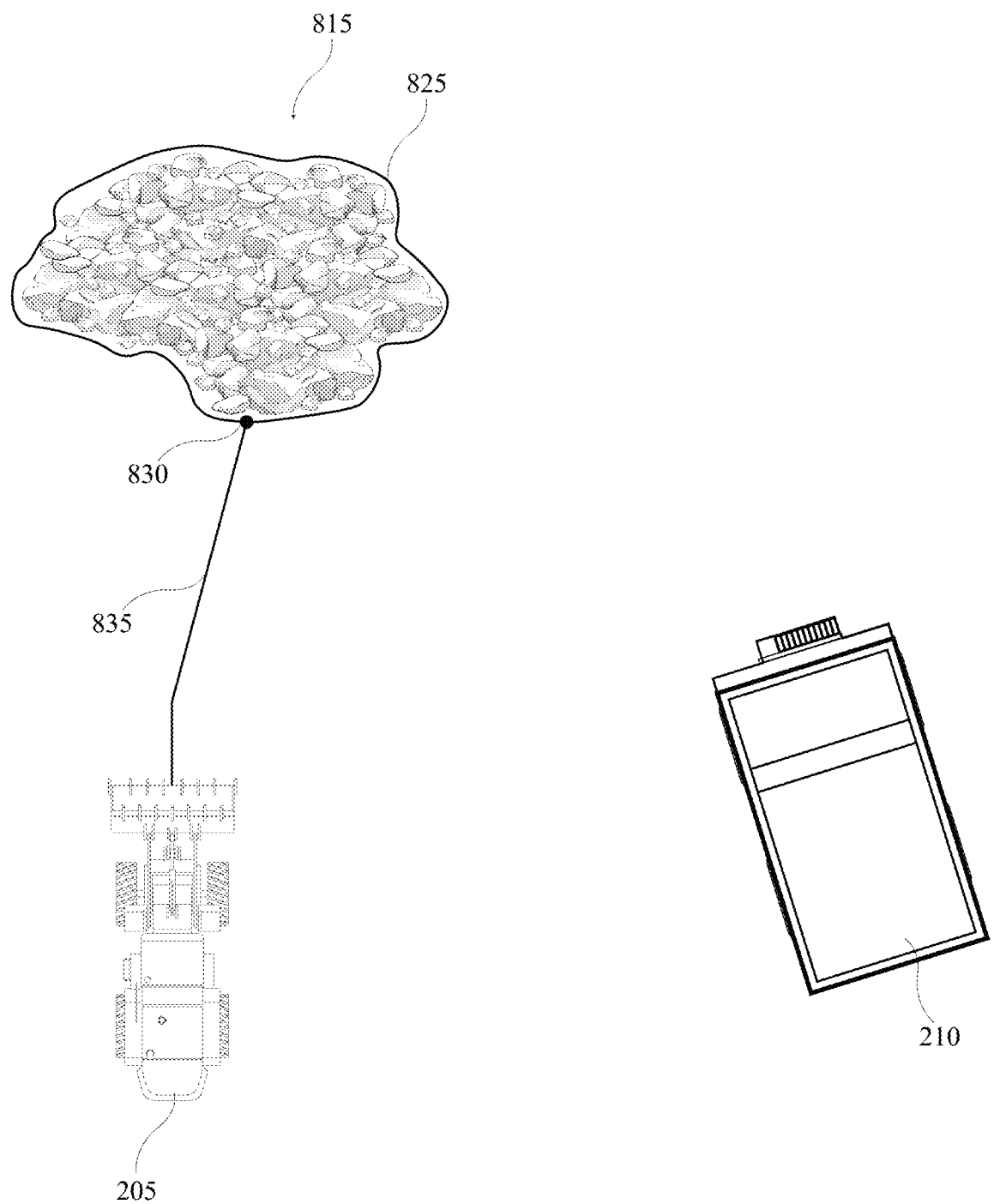
FIG. 10 is an illustration of a work zone showing a defined load path according to some embodiments.

At block 720 a load path 835 can be defined as shown in FIG. 10. The load path 835, for example, can be defined based on the current location of the autonomous loader 205 and the load approach vector 840. The load path 835, for example, can also be defined based on the turning radius of the autonomous loader or other characteristics of the work zone. The load path 835 can be mapped in the mapping software using any type of path mapping technique. In some embodiments, the load path may be affected by terrain, obstacles, vehicles, persons, etc.

Figure 11:
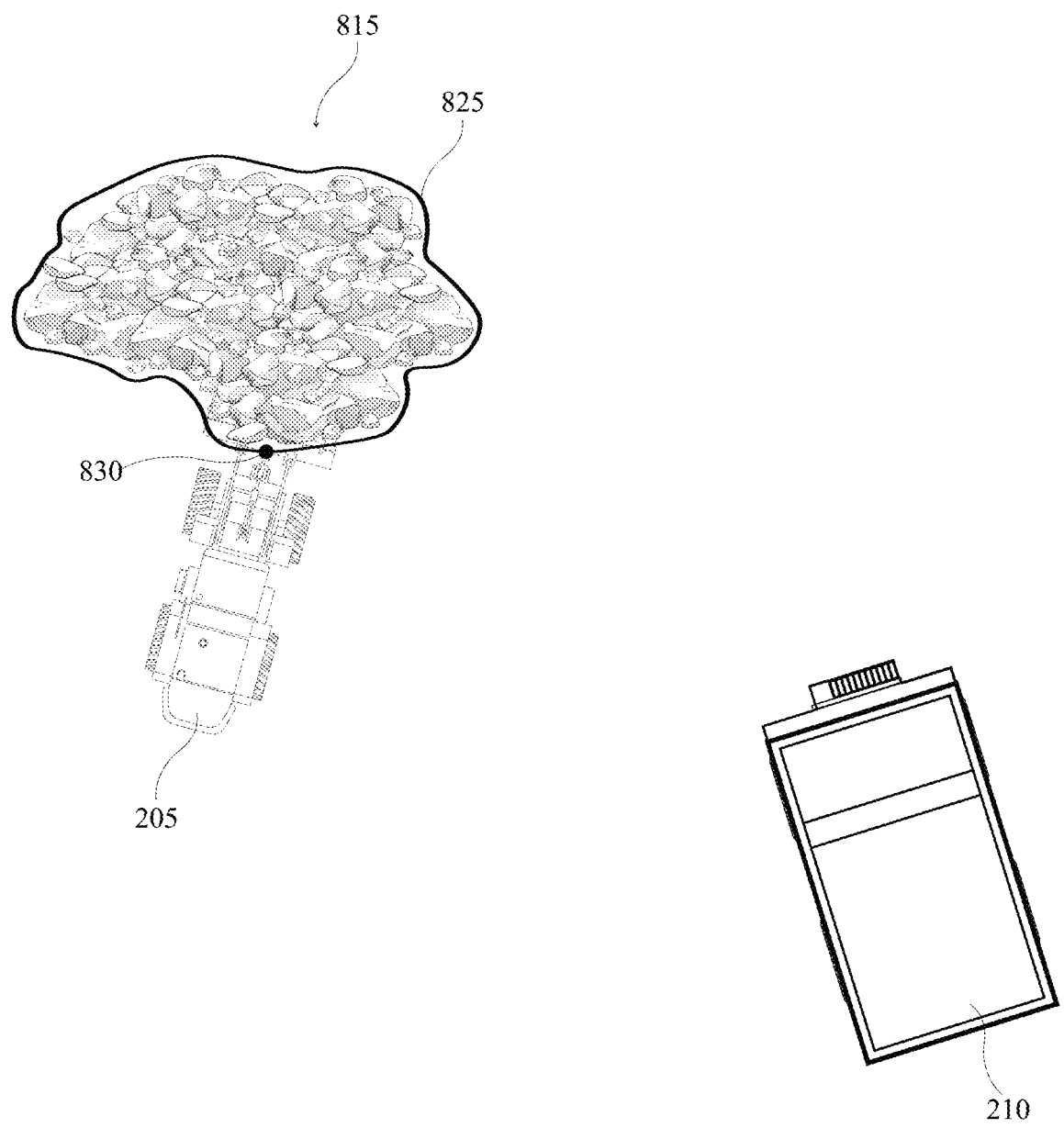
FIG. 11 is an illustration of a work zone with an autonomous loader at a load after following the load path according to some embodiments.

At block 725 the autonomous loader can approach the load pile along the load path 835 and gather a load as shown in FIG. 11. As shown, the load is gathered from the load zone 815 at the load zone location 830.

Figure 12:
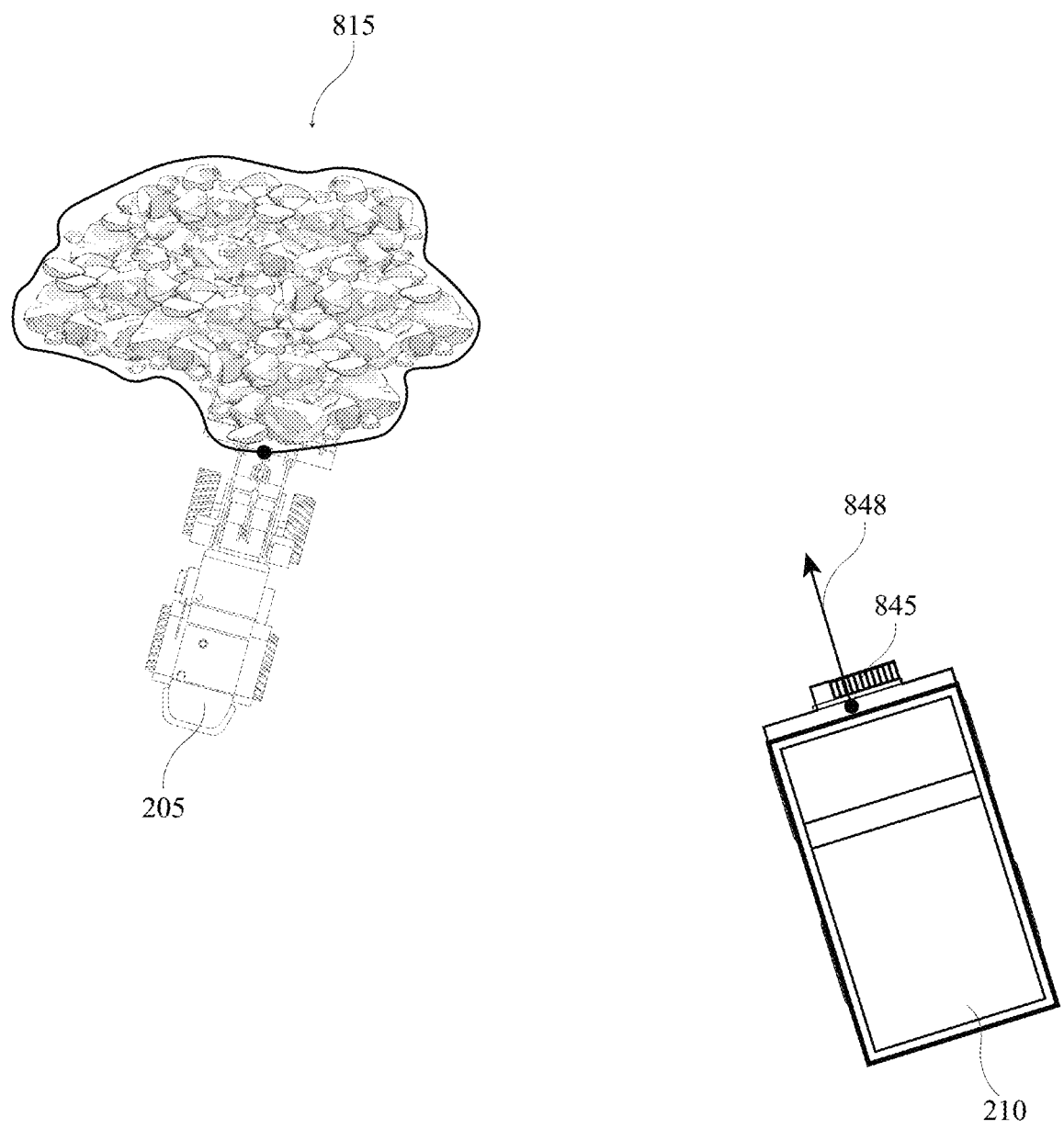
FIG. 12 is an illustration of a work zone showing a position and heading of a dump truck according to some embodiments.

At block 730 a dump truck position 845 and a dump truck heading 848 of the dump truck 210 can be determined as shown in FIG. 12. The dump truck position 845, for example, may include the position of the cab of the dump truck 210 or the position of any other portion of the dump truck. The dump truck position 845, for example, may be determined based on geolocation date such as, for example, using spatial locating device 142.

The dump truck heading 848 can be determined using a compass or the spatial locating device 142.

Figure 13:
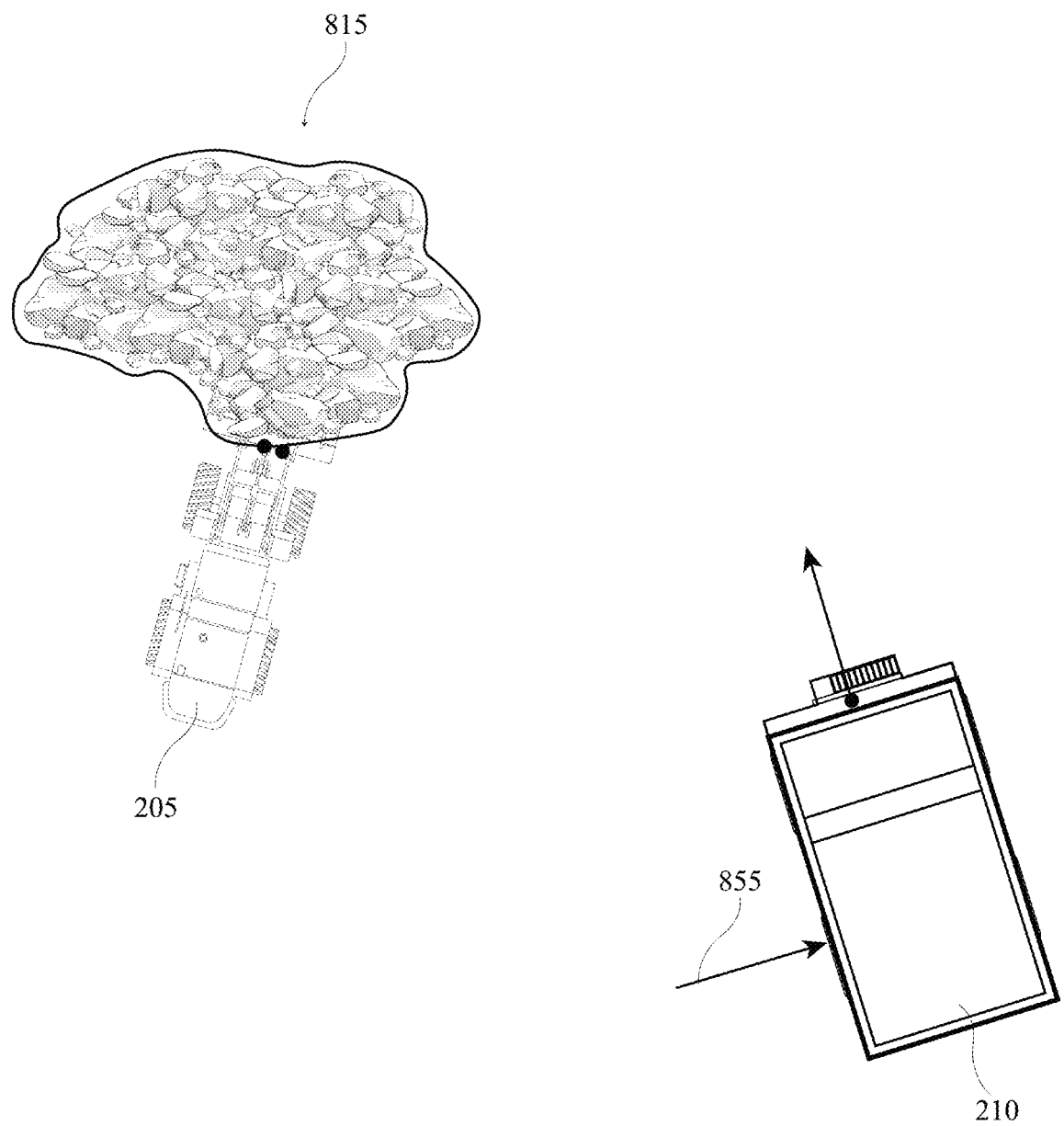
FIG. 13 is an illustration of a work zone showing an approach to the dump truck according to some embodiments.

At block 735 a dump truck approach vector 855 can be defined as shown in FIG. 13. The dump truck approach vector 855, for example, can be defined based on the dump truck position 845, the dump truck heading 848, data defining the size and shape of the dump truck 210, data indicating the history of previous loads dumped into the dump truck 210, the position of the autonomous loader 205, or the position of the load zone 815.

Alternatively, the heading of a dump location (e.g., a hopper) or an approach vector to the dump location may also be determined or found or received.

In some embodiments, the dump truck approach vector 855 may be located on the side of the dump truck 210 that is closest to either or both the autonomous loader 205 or the load zone 815. A distance between a position on each side of the dump truck 210 and either or both the load zone 815 and the autonomous loader 205 can be calculated. The side of shortest distance can be determined, which indicates which side of the dump truck the dump truck approach vector 855 should be used.

In some embodiments, a two dimensional offset from the dump truck position 845 can be used to determine a location for the dump truck approach vector 855 based on the dimensions or geometry of the dump truck. If the dump truck position 845 is the position of the center of the cab of the dump truck, for example, then an offset can be used to position the dump truck approach vector 855 to the side and rear of the dump truck. The position the dump truck approach vector 855 may also include an additional offset toward the rear of the dump truck to ensure that successive loads are not dumped one on top of another.

The angle of the dump truck approach vector 855, for example, may be 90 degrees relative to the dump truck heading 848. If the autonomous loader 205 is on the left side of the dump truck 210, then the dump truck approach vector 855 may be a positive 90 degrees from the dump truck heading 848. If the autonomous loader 205 is on the right side of the dump truck 210, then the dump truck approach vector 855 may be a negative 90 degrees from the dump truck heading 848.

Figure 14:
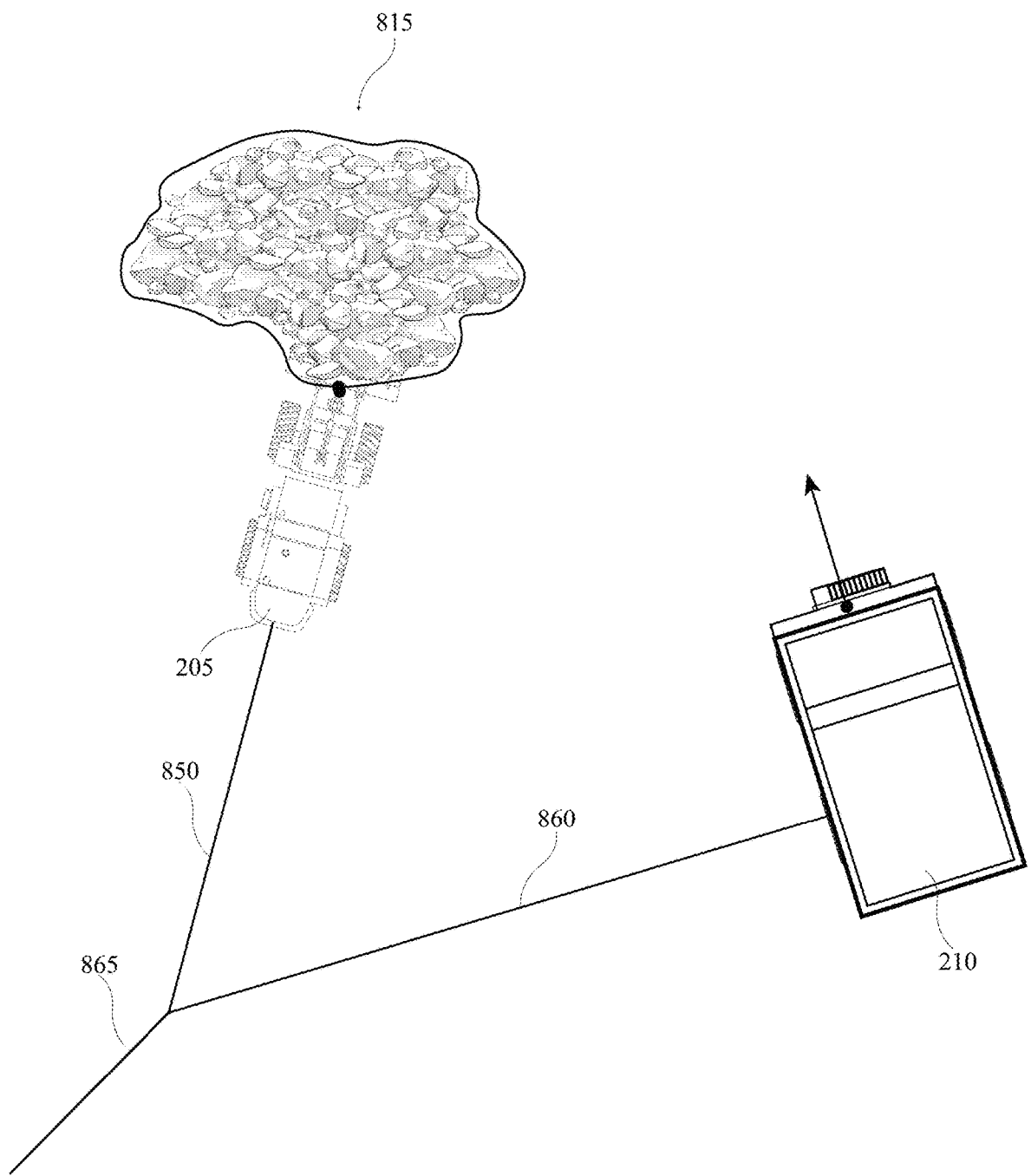
FIG. 14 is an illustration of a work zone with a defined backup path and a defined dump truck path according to some embodiments.

At block 740 a backup path 850 and a dump truck approach path 860 may defined as shown in FIG. 14. A reverse turn path 865 may also be defined. The backup path 850, for example, may have the same angle or heading as the load approach vector 840. The dump truck approach path 860 may have the same angle or heading as the dump truck approach vector 855. The reverse turn path 865 may be a path that begins at or near the point where the backup path 850 (or another path that positions the autonomous loader 205 near the dump truck 210) and the dump truck approach path 860 intersect. And the angle of the reverse turn path 865 may be the intersecting angle of the dump truck approach path 860 and the backup path 850. The length of the reverse turn path 865, for example, may be defined by the length or turning radius of the autonomous loader 205.

In some embodiments, the backup path 850 or the reverse turn path 865 may be defined while the autonomous loader is at the load zone 815. In some embodiments, the dump truck approach path 860 may be defined when the autonomous loader is positioned on the backup path 850 or the reverse turn path 865.

Figure 15:
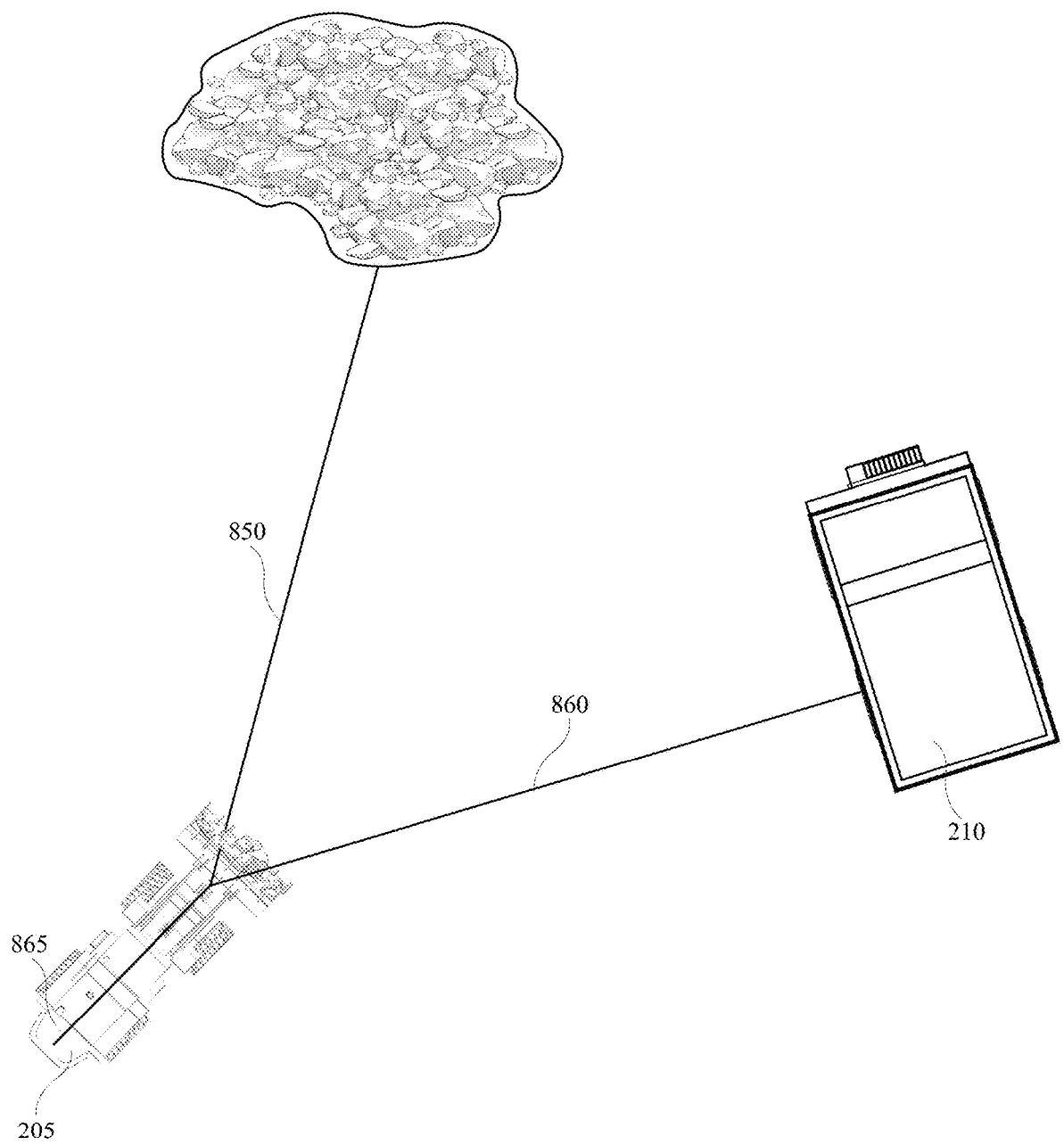
FIG. 15 is an illustration of a work zone with an autonomous loader following the back path according to some embodiments.
Figure 16:
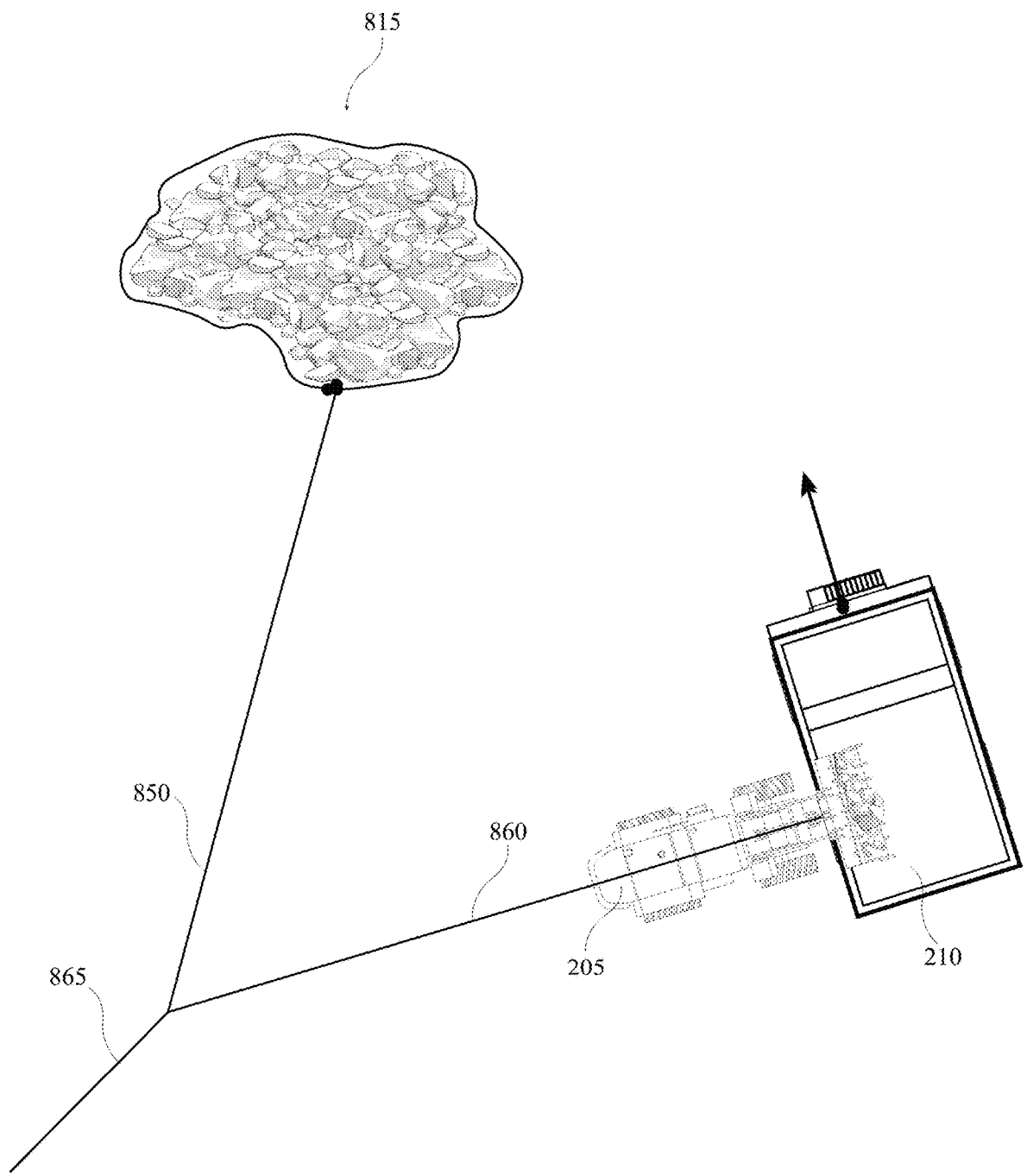
FIG. 16 is an illustration of a work zone with an autonomous loader at the dump truck after following the dump truck path according to some embodiments.

At block 745 the autonomous loader 205 backs up along the backup path 850 and the reverse turn path 865. The autonomous loader 205 may then follow the reverse turn path 865 and the dump truck approach path 860 forward to dump the load in the dump truck 210 as shown in FIG. 15 and FIG. 16.

In some embodiments, the paths (e.g., the load path 835, the backup path 850, the dump truck approach path 860, or the reverse turn path 865) may be determined by a base station (e.g., base station 174) or any third party system. In some embodiments, the paths may be created in a mapping system that creates a visual map for users to interact with and a map that includes data that can be followed by the autonomous loader including positions, speeds, headings, etc.

Figure 17:
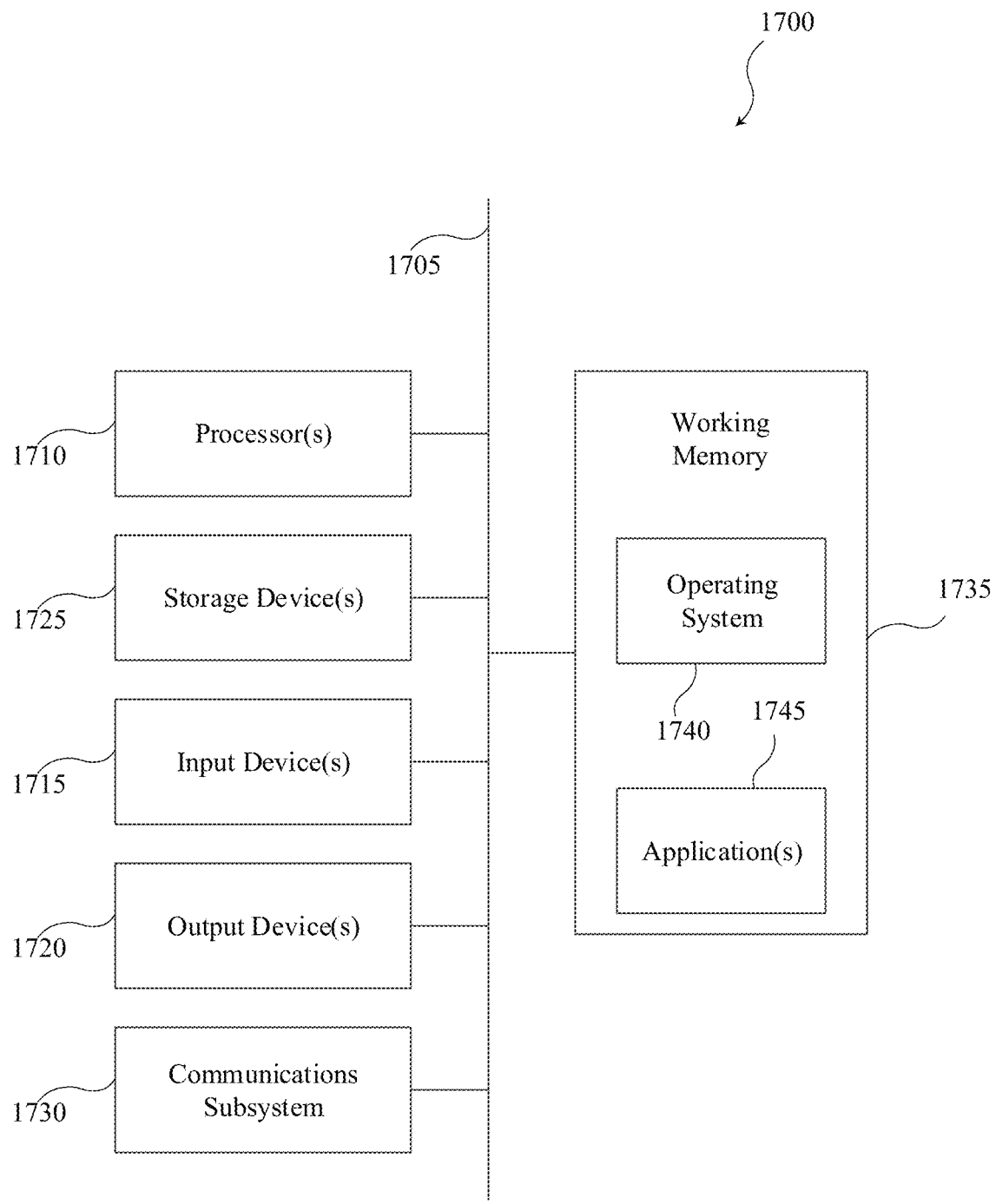
FIG. 17 shows an illustrative computational system for performing functionality to facilitate implementation of embodiments described herein.

The computational system 1700, shown in FIG. 17 can be used to perform any of the embodiments of the invention. In some embodiments, computational system 1700 may be remotely located as a base station or located on an autonomous loader. For example, computational system 1700 can be used to execute process 600 and/or process 700. As another example, computational system 1700 can be used perform any calculation, identification and/or determination described here. Computational system 1700 includes hardware elements that can be electrically coupled via a bus 1705 (or may otherwise be in communication, as appropriate). The hardware elements can include one or more processors 1710, including without limitation one or more general-purpose processors and/or one or more special-purpose processors (such as digital signal processing chips, graphics acceleration chips, and/or the like); one or more input devices 1715, which can include without limitation a mouse, a keyboard and/or the like; and one or more output devices 1720, which can include without limitation a display device, a printer and/or the like.

The computational system 1700 may further include (and/or be in communication with) one or more storage devices 1725, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 1700 might also include a communications subsystem 1730, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 1730 may permit data to be exchanged with a network (such as the network described below, to name one example), and/or any other devices described herein. In many embodiments, the computational system 1700 will further include a working memory 1735, which can include a RAM or ROM device, as described above.

The computational system 1700 also can include software elements, shown as being currently located within the working memory 1735, including an operating system 1740 and/or other code, such as one or more application programs 1745, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1725 described above.

In some cases, the storage medium might be incorporated within the computational system 1700 or in communication with the computational system 1700. In other embodiments, the storage medium might be separate from a computational system 1700 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 1700 and/or might take the form of source and/or installable code, which, upon compilation and/or installation on the computational system 1700 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. An autonomous loader comprising:
   a speed control mechanism;
   a steering system;
   a bucket;
   a geolocation sensor that can produce loader geolocation data;
   a sensor array;
   a transceiver that can communicate with and receive data from at least a base station; and
   a controller communicatively coupled with the speed control mechanism, the steering system, the geolocation sensor, the sensor array, and the transceiver, the controller has code that:
     receives dump truck geolocation data for a dump truck via the transceiver;
     receives loader geolocation data for the autonomous loader;
     receives sensor data from the sensor array indicating the presence of the dump truck;
     raises the bucket on the autonomous loader to a height;
     directs the autonomous loader toward the dump truck via either or both the speed control mechanism and the steering system using the loader geolocation data and the dump truck geolocation data so that the bucket is positioned above a body or bed of the dump truck;

ignores warnings indicating that the loader is approaching the dump truck along the path of the autonomous loader, such that the loader gets closer to the dump truck than a predetermined proximity to allow the loader to be close enough to the dump truck to dump a load in the bucket regardless of the warnings; and rotate the bucket downward to release the load in the bucket into the body or bed of dump truck.

2. The autonomous loader according to claim 1, wherein the loader geolocation data is received via the geolocation sensor.

3. The autonomous loader according to claim 1, wherein the loader geolocation data is derived from sensors on the autonomous loader.

4. The autonomous loader according to claim 1, further comprising a bucket control system that receives signals from the controller to raise the bucket and rotate the bucket.

5. The autonomous loader according to claim 1, wherein the controller guides the loader toward the dump truck using a path received from a base station via the transceiver.

6. The autonomous loader according to claim 1, wherein the sensory array comprises at least one sensor selected from the list consisting of lidar, radar, camera, and sonar.

7. The autonomous loader according to claim 1, wherein the dump truck geolocation data comprises GPS data and the loader geolocation data comprises GPS data.

8. The autonomous loader according to claim 1, wherein the loader geolocation data includes corrections for the position of the bucket relative to the geolocation sensor.

9. The autonomous loader according to claim 1, wherein the dump truck geolocation data indicates the location of the body or bed of the dump truck.

10. The autonomous loader according to claim 1, wherein the height is based on the height of the walls of the body or bed on the dump truck.

11. The autonomous loader according to claim 1, wherein the height is derived from sensor data sensing the dump truck.

12. The autonomous loader according to claim 1, wherein the dump truck geolocation data is received from a base station via the transceiver.

13. A method comprising:

receiving dump truck geolocation data for a dump truck;

receiving loader geolocation data for an autonomous loader;

receiving sensor data from a sensor array indicating the presence of the dump truck;

raising a bucket on the autonomous loader to a height;

directing the autonomous loader toward the dump truck using the loader geolocation data and the dump truck geolocation data so that the bucket is positioned above a body or bed of the dump truck;

ignoring warnings indicating that the loader is approaching the dump truck based on the sensor data such that the loader gets closer to the dump truck to allow the loader to be close enough to the dump truck to dump a load in the bucket regardless of the warnings; and rotating the bucket downward to release the load in the bucket into the body or bed of the dump truck.

14. The method according to claim 13, further comprising guiding the loader toward the dump truck using a path provided by a base station.

15. The method according to claim 13, wherein the dump truck geolocation data comprises GPS data and the loader geolocation data comprises GPS data.

* * * * *